(No Model.) 2 Sheets—Sheet 2.
J. V. ROWLETT.
BAND SAWING MACHINE.
No. 313,025. Patented Feb. 24, 1885.
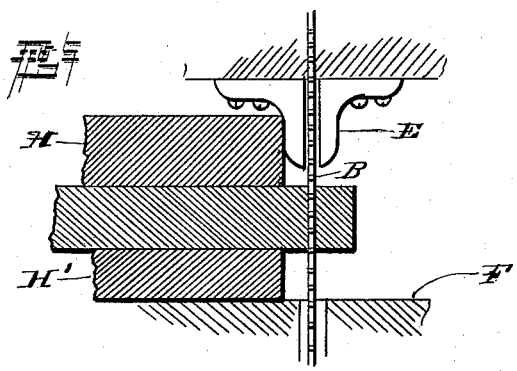
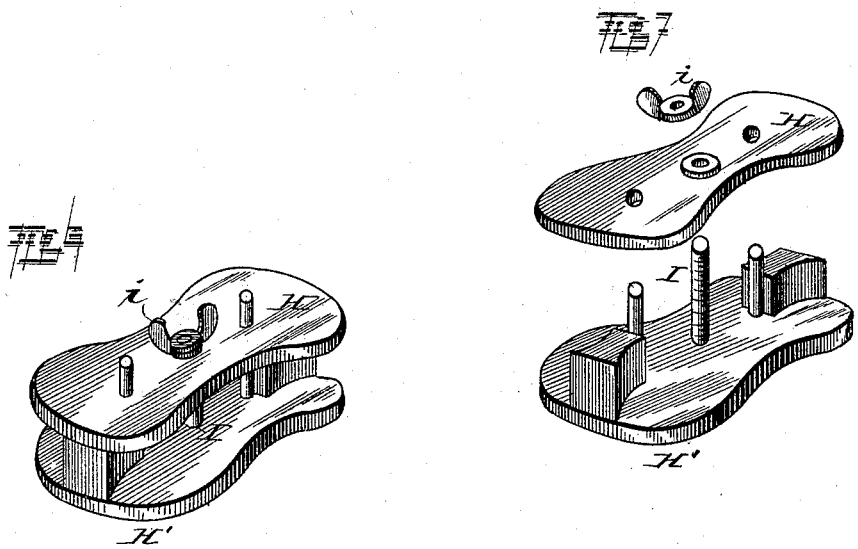
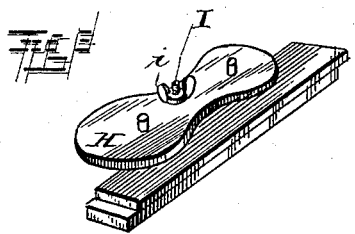
WITNESSES:
Fred. G. Dieterich.
Jos. A. Ryan.
INVENTOR.
Jacob V. Rowlett
By F. B. Hunt
ATTORNEY

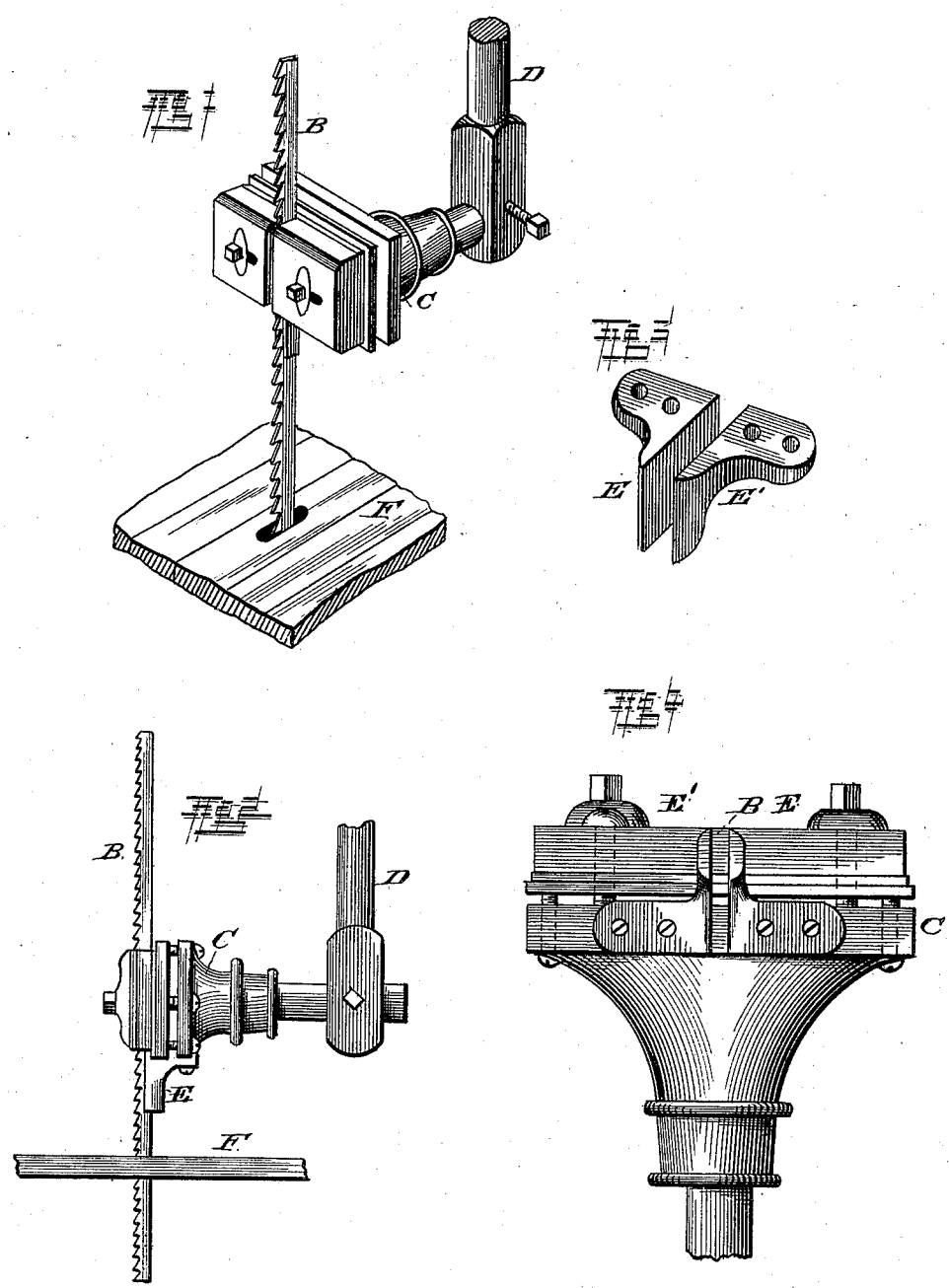

UNITED STATES PATENT OFFICE.

JACOB V. ROWLETT, OF RICHMOND, INDIANA.

BAND SAWING MACHINE.

SPECIFICATION forming part of Letters Patent No. 313,025, dated February 24, 1885.

Application filed September 1, 1884. (No model.)

*To all whom it may concern:*

Be it known that I, JACOB V. ROWLETT, of Richmond, in the county of Wayne and the State of Indiana, have invented certain Improvements in Band-Saw Attachments, of which the following is a specification.

My invention relates to an improvement in band-saw attachments for the purpose of cutting out fretted or irregular work; and it consists in a pair of guides attached to the guide-head of the same and a clamp form or pattern between which the stuff to be sawed is held, all as hereinafter fully described and set forth in the specifications and claims.

Figure 1 is a perspective of the guide-head. Fig. 2 is an elevation of the same. Fig. 3 is a perspective of the guides. Fig. 4 is an inverted plan of guide-head and guides attached. Fig. 5 represents the same and guides, with the work in place. Fig. 6 represents the clamp-form; Fig. 7, the same; Fig. 8, the same with work clamped between.

B represents the saw; C, the guide-head; D, the vertical shaft that supports the guide-head; E and E', the guides attached to the guide-head, and against which the form or pattern moves. The front elevation, Fig. 5, shows the same with work applied thereto.

Fig. 6 represents the clamp-form which holds the work, the upper part, H, resting against the guide E. Different thicknesses or one or any number of pieces may be clamped in the clamp-form, as shown in Fig. 8, the upper piece, H, of the clamp-form being the guide to the work, and is pressed against the guide E or E', as the case may be. Fig. 7 shows the form H detached. The upper part, H, may be used simply with points to pass into the material to be worked, and thus do entirely without the lower part, H', of the clamp-form. The clamp-form is held together by means of the screw-bolt I and thumb-nut *i*. F represents the saw-table.

The operation of the parts described is as follows: The saw B is carried by pulleys in the usual manner, and the work, clamped in the form H H', is presented to the saw, the upper plate of the form being pressed against one or the other of the guide-lugs E or E', as shown in Fig. 5. In this manner the required pattern is cut easily and quickly, the clamp-form being wholly independent of the other parts and readily interchangeable, for the purpose of cutting different patterns.

I am aware that it is not broadly new to use a clamp-form to hold the work and guide it to the saw or cutters, and I do not broadly claim such a device.

Having thus fully described my invention, what I claim, and desire to secure by Letters Patent, is—

1. In a band-saw mill, the combination, with the guide-head, of depending guide-lugs, between which the saw runs, and an independent clamp-form, holding the work and adapted to bear against either guide-lug, whereby the line of cut is caused to follow the conformation of the clamp-form, substantially as and for the purpose set forth.

2. In a band-saw mill, the combination, with the guide-head C, of the detachable guide-lugs E E', depending from the guide-head upon each side of the saw, and a form holding and guiding the work, substantially as and for the purpose set forth.

3. The combination, with the guide-head C, having the depending guide-lugs E E', of the saw B, running between said guide-lugs, and the independent clamp-form H and H', all substantially as and for the purpose described.

JACOB V. ROWLETT.

Witnesses:
F. B. HUNT,
WM. A. PEELLE.